United States Patent [19]

King et al.

[11] 4,064,327

[45] Dec. 20, 1977

[54] ALUMINUM-CHLORINE THERMAL BATTERY

[75] Inventors: Lowell A. King, Colorado Springs, Colo.; George D. Brabson, Jr., Albuquerque, N. Mex.; John K. Erbacher, USAF Academy, Colo.; David W. Seegmiller, London, England; Armand A. Fannin, Jr., USAF Academy, Colo.; John T. Viola, Washington, D.C.

[73] Assignee: The United States of America as represented by the Secretary of the Air Force, Washington, D.C.

[21] Appl. No.: 767,233

[22] Filed: Feb. 9, 1977

[51] Int. Cl.$^2$ ............................................. H01M 6/36
[52] U.S. Cl. .................................... 429/112; 429/191; 429/199; 429/218
[58] Field of Search ......... 429/112, 218, 191, 199–201

[56] References Cited

U.S. PATENT DOCUMENTS

| | | | |
|---|---|---|---|
| 3,189,485 | 6/1965 | Panzer | 429/112 X |
| 3,632,448 | 1/1972 | Beltzer | 429/112 X |
| 3,650,834 | 3/1972 | Buzzelli | 429/112 |
| 3,671,322 | 6/1972 | King et al. | 429/112 X |
| 3,787,242 | 1/1974 | Seegmiller et al. | 429/112 |

Primary Examiner—Charles F. LeFevour
Attorney, Agent, or Firm—Joseph E. Rusz; William J. O'Brien

[57] ABSTRACT

An aluminum-chlorine, thermally activated, electrochemical cell composed of an aluminum anode, an inert metal cathode and a two-layered pelletized electrolyte sandwiched therebetween and composed of a mixture of aluminum chloride with one or more salts of sodium chloride, lithium chloride, potassium chloride and tetrasubstituted ammonium chloride.

1 Claim, 2 Drawing Figures

ALUMINUM-CHLORINE THERMAL BATTERY

STATEMENT OF GOVERNMENT INTEREST

The invention described herein may be manufactured and used by or for the Government for governmental purposes without the payment of any royalty thereon.

BACKGROUND OF THE INVENTION

This invention relates to a thermally activated electrochemical cell. In a more particular aspect, this invention concerns itself with a high energy density, expendable, primary thermal battery in pelletized form which utilizes aluminum chloride containing electrolytes.

The present interest in the development of weight sensitive communication systems for both military and civil applications has generated a considerable research effort in the fabrication of light weight, maintenance free, high density power supplies. The emphasis in the research effort has been placed on those experimental investigations and theoretical studies which elucidate the nature of the $AlCl_3/NaCl$ electrolyte system and the behavior of electrodes immersed in these electrolytes.

For example, it has been found that, if a concentration cell was created using two aluminum electrodes and two different $AlCl_3/NaCl$ electrolytes, a significant voltage of about 0.2 V could be achieved. Also, it was found that, if one of the electrolytes in the concentration cell was held saturated with respect to sodium chloride, a markedly enhanced voltage of about 0.6 V could be obtained. Additional research resulted in the fabrication of an aluminum-chlorine formation cell which used a paste cathode consisting of a mixture of electrolyte and graphite powder. These cells were assembled in large test tubes with corks in the tops. In spite of the crude construction, the cells had very promising features. Perhaps the most noteworthy feature was the ability to deliver large currents without apparent polarization or passivation. However, implementation of these cells was not found feasible for practical applications. Additional research was necessary, therefore, in order to fabricate a workable and practical battery capable of taking advantage of the attractive features of the aluminum-chlorine electrochemical system. The thermal battery of this invention resulted from that research effort and provides a practical solution to the problem of providing a light-weight, reliable, maintenance free power source operable at temperatures ranging from 109° to 222° C.

SUMMARY OF THE INVENTION

It has been discovered that the implementation of the aluminum-chlorine electrochemical system can be achieved through the fabrication of a practical and useful low temperature thermal battery in pelletized form. The battery is a thermally activated, reserve battery which consists of a stack or stacks of individual cells. A typical cell is composed of an aluminum metal plate or sheet which serves as the anode.

A two-layered electrolyte pellet which will be described hereinafter, and, an inert metal plate or sheet which serves as the cathodic current collector. Heat powder or heat paper is placed between and/or around the cells as necessary to heat the battery to operating temperatures. Inter-cell electrical connections, a device to initiate the firing of the heat paper or powder, and a container complete the essential components.

The two-layered electrolyte pellet consists of a mixture of aluminum chloride with one or more of the salts; lithium chloride, sodium chloride, potassium chloride, or one of the several tetrasubstituted ammonium chlorides. The mixture also contains an amount of binder or immobilizing agent such as finely divided silica or alumina. The electrolyte pellet is considered to be two-layered because the half of the pellet which lies in contact with the cathodic current collector also contains in the mixture an amount of finely divided graphite which serves as the actual cathodic site and as an electronic conductor leading from the pellet interior to the current collector. Elemental chlorine is the electroactive cathode. It is absorbed on the graphite surface and may be physically or electrically absorbed on the graphite before the cell is assembled, or the cell may be heated and electrically "charged" after assembly. The cell is totally inert until raised in temperature by the heat paper or powder to the melting temperature of the electrolyte. The cell of this invention is constructed of low cost materials, and is intended to be expendable.

Accordingly, the primary object of this invention is to provide a practical and useable, lightweight, reliable, low temperature activated battery capable of taking advantage of the aluminum-chlorine electrochemical system.

Another object of this invention is to provide a high energy density, expendable, primary, thermal battery in pelletized form which utilizes an aluminum chloride containing electrolyte.

Still another object of this invention is to provide a low temperature thermal battery capable of routine operation at temperatures of about 130° to 160° C and at lifetimes from about 5 to 180 minutes.

The above and still other objects and advantages of the present invention will become more readily apparent upon consideration of the following detailed description thereof when taken in conjunction with the accompanying drawings.

DESCRIPTION OF THE PREFERRED EMBODIMENTS

Figure 1:
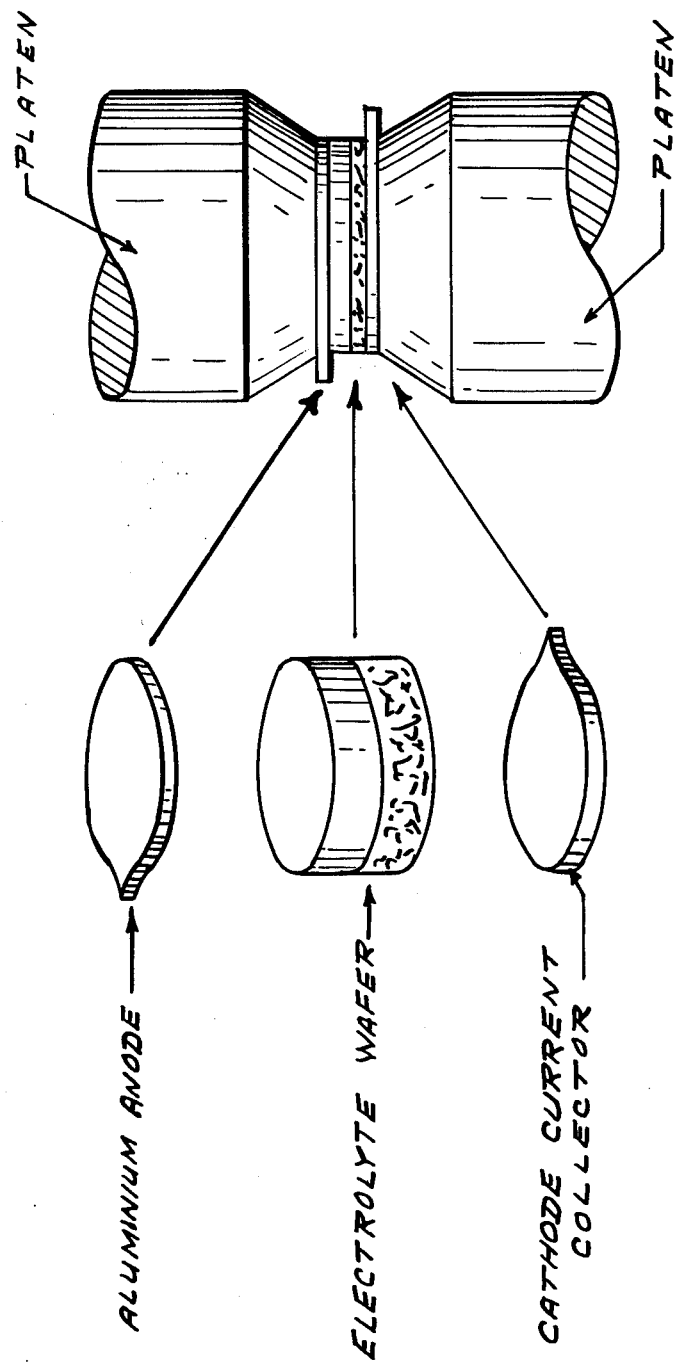
FIG. 1 represents an isometric view of a typical cell of this invention.
Figure 2:
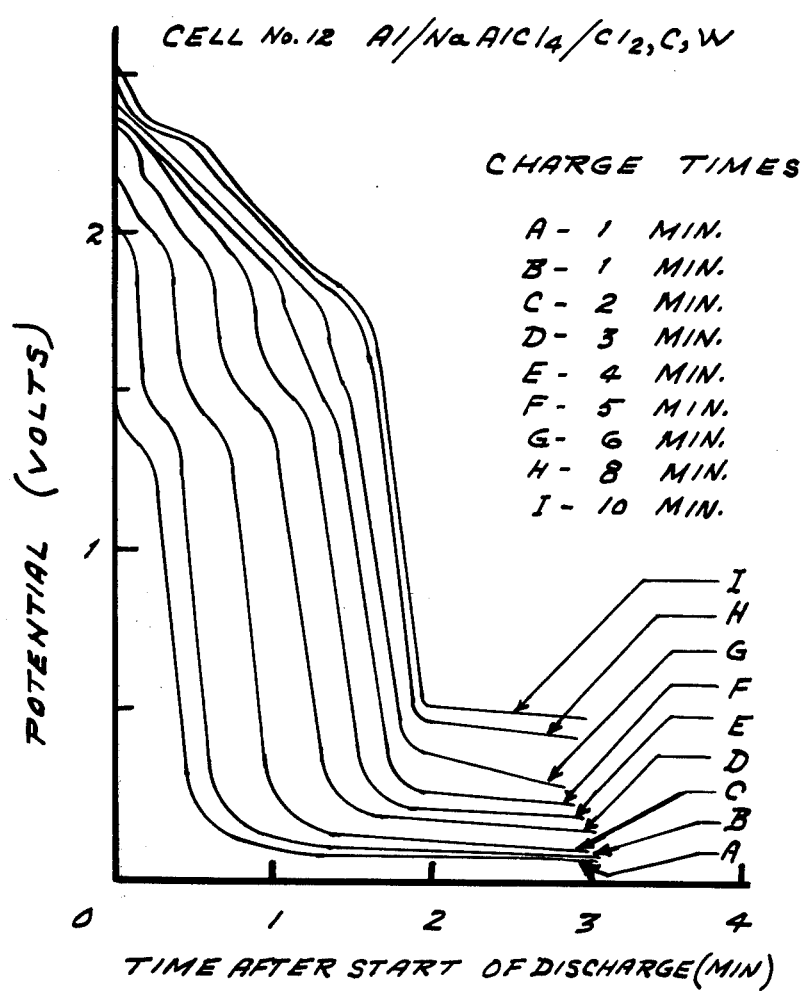
FIG. 2 represents a graphical illustration showing a discharge profile for a typical cell of this invention.

Pursuant to the above-defined objects, the present invention provides an aluminum-chlorine electrochemical cell which can be used in a pile type thermal battery. The battery is thermally activated at relatively low temperatures on the order of 130°–160° C and consists of a stack or stacks of individual cells. A typical cell consists of a two-layered, pelletized electrolyte sandwiched between an aluminum anode and an inert metal cathode composed of either tungsten, nickel or stainless steel.

The two-layered electrolyte pellet consists of either a binary or ternary mixture of aluminum chloride with one or more of the salts: lithium chloride, sodium chloride, potassium chloride, or one of the several tetrasubstituted ammonium chlorides. The mixture also contains an amount of binder or immobilizing agent such as finely divided silica or alumina. The electrolyte pellet is considered to be two-layered because the half of the pellet which lies in contact with the cathodic current collector also contains in the mixture an amount of finely divided graphite which serves as the actual cathodic site and as an electronic conductor leading from the pellet interior to the current collector. Elemental chlorine is the electroactive cathode. It is absorbed on the graphite surface and may be physically or electrically absorbed on the graphite before the cell is assembled, or the cell may be heated and electrically "charged" after assembly. The cell is totally inert until raised to the melting temperature of the electrolyte. This is accomplished by placing heat powder or heat paper between and/or around the cells as necessary to heat the battery to operating temperature. Inter-cell connections, a device to initiate the firing of the heat paper or powder, and a suitable container complete the battery. It should be noted, however, that FIG. 1 of the drawing does not show a heat paper or heat powder, nor multiple stacks, nor thermal battery containers. These technologies are conventional and a detailed description and discussion of such components are not relevent to the invention. One skilled in the art could easily accommodate these thermal battery components to the electrochemical cell of this invention.

A number of cells which can be considered for use in a low temperature, pile type, thermally activated, reserve battery were fabricated in accordance with the teachings of this invention. FIG. 1 of the drawing discloses the construction features of a typical cell. The anolyte and the catholyte usually had the same composition, although in some cells they were purposefully different. Cathodes were graphite on which chlorine was adsorbed. Cathodic current collectors were nickel, tungsten, or stainless steel. Materials used to immobilize the electrolyte included fiberglass felt and Cab-O-Sil, a high surface area silicon dioxide manufactured by the Cabot Corporation. Operating temperatures ranged from 91° C to 201° C.

While several schemes were used to heat the cells and hold them in place, all were fundamentally like that shown in FIG. 1. The electrolyte wafer shown in FIG. 1 was either a bipellant, as described below, or two individual pellets, or two or more fiberglass felt pads into which molten electrolyte had previously been impregnated. In the latter case, the graphite was placed as a thin powder layer between the catholyte wafer and the cathodic current collector. Cells were typically operated at a platen press pressure of 2.6 to 7.1 pounds per square inch.

A typical preparation of a bipellet involved first preparing binder-electrolyte anolyte mixtures and binder-graphic-electrolyte catholyte mixtures. These mixtures were made by stirring into the molten electrolyte at ca. 250° the binder and, if appropriate, the graphite. Sufficient binder was added to give the melt a consistency similar to wet snow. The mixture was then cooled and pulverized in a mill. (In "precharged" cells, the graphite either had been heated previously with chlorine gas, or the melt was electrolyzed with the graphite being the anode before the binder was added).

The required amount of anolyte mixture was placed in a 1.125 in. diameter Carver die and pressed to ca. 5000 psi. Next, the catholyte mixture was added and the entire bipellet was pressed at ca. 24000 psi.

There is a considerable variation in permissible binder composition, die pressure, platen press pressure, and the values quoted here should be considered as examples only.

The anode, electrolyte wafer, and current collector were placed in the platen according to the experimental protocol.

Table I provides a brief summary of the parameters for various cells constructed as above. Each of the cells of Table I will be described in the paragraphs following Table I in the chronological order in which they were evolved.

TABLE I

| CELL NUMBER | ELECTRODE MATERIALS | MOLE FRACTION AlCl | | EXCESS NaCl NEXT TO ANODES | T(°) | ELECTROLYTE CATHODE MATERIAL | ELECTRO ACTIVE MATERIAL |
|---|---|---|---|---|---|---|---|
| | | ANOLYTE | CATHOLYTE | | | | |
| 1 | Al/W (Note 1) | 0.50 | 0.50 | Yes - Powdered | 180 | Fiberglass Felt | Graphite |
| 2 | Al/W (Note 1) | 0.50 | 0.50 | Yes - in wafer | 165,182 | Cab-o-Sil | Graphite |
| 3 | Al/W | 0.50 | 0.54 | Yes - in wafer | 166 | Cab-o-Sil | Graphite |
| 4 | Al/W | 0.64 | 0.64 | No | 91-139 | Cab-o-Sil | Graphite |
| 5 | Al/W | 0.50 | 0.50 | Yes - in wafer | 165 | Cab-o-Sil | Graphite |
| 6 | Al/W | 0.50 | 0.50 | Yes - in wafer | 165 | Cab-o-Sil | Graphite |
| 7 | Al/Ni | 0.50 | 0.50 | Yes - in wafer | 164 | Cab-o-Sil | Graphite |
| 8 | Al/Stainless Steel | 0.50 | 0.50 | Yes - in wafer | 166 | Cab-o-Sil | Graphite |
| 9 | Al/W | 0.50 | 0.50 | Yes - in wafer | 163 | Cab-o-Sil | Purified Graphite |

NOTE 1: In Cells No. 1 and No. 2, each electrode was divided into two equal sections, a working section and a reference section.

The anode assembly for cell No. 1 had both a working electrode section and a reference electrode section. Each of the two anodes was cut from a piece of 15 mil aluminum, was semi-circular in shape (diameter equal 4 cm), and had a 1 cm wide tab that served to carry the current. The two anodes were attached to a rectangular piece of synthetic mica using adhesive backed fiberglass tape. The anolyte, saturated with respect to sodium chloride, was immobilized by a woven fiberglass disc 3.7 cm in diameter. The separator was constructed from a piece of synthetic mica having a 22.5 mm hole in the center which was filled with a fiberglass felt wafer impregnated with melt saturated with respect to sodium chloride. The catholyte wafer was identical with the anolyte wafer. A thin layer of finely powdered graphite was placed between the catholyte wafer and the cathode assembly. The cathode assembly consisted of two pieces of 5 mil tungsten foil attached to a rectangular piece of synthetic piece of synthetic mica. The two pieces of tungsten foil were separated by a distance of about 1 mm, and served as reference and working electrodes.

Cell No. 2 was the first of the cells to use Cab-O-Sil to immobilize the electrolyte, and had the following components: Aluminum anode assembly having both working and reference electrodes, electrolyte pellet located in a 1.125 in. diameter hole in a piece of synthetic mica, and cathode assembly also having both working and reference electrodes. Table II summarizes the composition and weight of the electrolyte pellet used in this and subsequent formation cells described in this invention.

The objective of experiments with Cell No. 3 was to examine the effect of using a catholyte which was rich in aluminum chloride. Cell No. 3 was very similar to Cell No. 2 except that the sodium chloride saturated catholyte used in the earlier cell was replaced with catholyte having approximately 54 mole percent aluminum chloride. Also, this cell and all subsequent cells described herein had only a single cathode and a single anode.

Cell No. 4 was uniquely different from all of the other cells in that a ternary rather than a binary electrolyte was used. The ternary electrolyte has the following molar composition: $AlCl_3$-63.5 percent, KCl-16.5 percent, and NaCl-20.0 percent. Cell No. 4 did not have extra sodium chloride in the anolyte section of the electrolyte wafer.

Experience with Cell No. 3 indicated that the use of a cathode which was unsaturated with respect to sodium chloride resulted in significant degradation of the performance of the cells. Accordingly, beginning with Cell No. 5, the use of an electrolyte unsaturated with respect to sodium chloride in the catholyte section of the electrolyte wafer was abandoned.

The purpose of experiments with Cell No. 6 was to evaluate the effect of changing the rate of charge. This cell was identical with Cell No. 5.

Cell No. 7 used nickel rather than tungsten as the cathode current collector. In all other respects this cell was identical with Cell No. 5.

In an effort to determine whether stainless steel might be a suitable cathode current collector, Cell No. 8 incorporated such a current collector material. In all other respects, this cell was identical with Cell No. 5.

The objective of experiments with Cell No. 9 was to evaluate the use of graphite which had been purified at 600° C in a chlorine atmosphere. With the exception of the different graphite used in this cell, this cell was identical with Cell No. 5.

The most important piece of information derived from a typical transient discharge experiment is the internal resistance of the cell. The data for transient discharge experiments with the cells of this invention are summarized in Table II. This table also indicates for each experiment the key features which influenced the observed internal resistance. The broad conclusions which can be drawn from Table II are summarized in the paragraphs following:

cells used electrolyte pellets immobilized with Cab-O-Sil. The data for Cell No. 1 can be placed in perspective by comparing them with the data for Cell No. 5. When making this comparison, it must be remembered that the area of Cell No. 5 was 3.4 times the area of Cell No. 1; the thickness of the Cab-O-Sil immobilized pellet was approximately two times the thickness of the stack of fiberglass felt electrolyte wafers. Keeping these facts in mind, it is apparent that the internal resistance of a typical cell having a Cab-O-Sil immobilized electrolyte is significantly smaller than the internal resistance of a cell in which fiberglass felt is used to immobilize the electrolyte. As noted earlier, this observation reflects, at least in part, the fact that the Cab-O-Sil immobilized pellets were more deformable than the fiberglass felt electrolyte wafers, and hence the Cab-O-Sil immobilized pellets more intimate contact with the current collectors.

In formation, cell No. 3, the anolyte was saturated with respect to sodium chloride while the catholyte was rich in aluminum chloride. One of the objectives of the experiments with this call was to characterize behavior of formation cells having "built in" concentration potentials. The data in Table III strongly suggest that cells with aluminum chloride rich catholytes have larger internal resistances than cells which have catholytes saturated with respect to sodium chloride. Note, for example, that Cell No. 5, which had a catholyte saturated with respect to sodium chloride, had a value for the internal resistance which is half of the value of the internal resistance for Cell No. 3. This result is somewhat unexpected inasmuch as the sodim ion is essentially the only current carrying species in the electrolyte, and the activity of the sodium ion in an electrolyte having a mole fraction of 0.54 $AlCl_3$ is essentially identical with the activity of sodium ion in an electrolyte saturated with respect to sodium chloride.

Cell No. 7 had a nickel cathode current collector. The data in Table III clearly indicate that these cells had much higher internal resistances than cells with tungsten cathode current collectors. This observation can probably be attributable to the fact that the nickel and stainless steel chathode current collectors reacted with the melt to yield high resistance electrolytes.

To analyze the impact of purifying the graphite used in the cathode layer of the electrolyte pellet, one should compare the results for Cell No. 5 with the results for Cell No. 9, which used purified graphite. Note that use of the purified graphite resulted in a small but significant reduction in the internal resistance of the cell.

TABLE II

| CELL NUMBER | RANGE | INTERNAL RESISTANCE (Ω) NUMBER OF DETERMINATIONS | AVERAGE VALUE | AREA ($cm^2$) | KEY FEATURES |
|---|---|---|---|---|---|
| 1 | 2.1–6.6 | 9 | 4.1 | 1.87 | Fiberglass felt electrolyte wafers |
| 2 | 0.30–0.83 | 9 | 0.53 | 3.08 | |
| 3 | 0.27–0.39 | 4 | 0.31 | 6.41 | $AlCl_3$ rich catholyte |
| 4 | 0.87–26 | 8 | 8.1 | 6.41 | Ternary melt |
| 5 | 0.13–0.17 | 5 | 0.15 | 6.41 | Baseline |
| 6 | 0.09–0.73 | 2 | 0.42 | 6.41 | Rate of charge experiments |
| 7 | 0.78 | 1 | 0.78 | 6.41 | Nickel cathode current collector |
| 8 | 0.5–1.2 | 3 | 0.09 | 6.41 | Stainless steel cathode current collector |
| 9 | 0.09–0.12 | 3 | 0.10 | 6.41 | Purified graphite |

The techniques were used for immobilizing the electrolyte in the cells. Cell No. 1 used a stack of fiberglass felt electrolyte wafers, while all remaining formation Cell No. 4, which had an electrolyte consisting of a ternary melt of approximately eutectic composition, was characterized by an unusually large internal resistance. This observation provides additional evidence in support of the hypothesis that small concentrations of a third salt dramatically influence the conductivity of sodium chloride-aluminum chloride electrolytes.

The use of very pure aluminum chloride ($AlCl_3$) as a reagent in the fabrication of the cells of this invention was found to be unnecessary because the procedures used for the preparation and purification of the $AlCl_3$/NaCl melts simultaneously removed the troublesome impurities normally present in the aluminum chloride. Accordingly, "Baker Analyzed" Reagent grade aluminum chloride was used without further purification. "Baker Analyzed" Reagent grade sodium chloride was also employed. It was dried in air at 530° C for 1 hour. The material was then cooled to room temperature in an evacuated chamber.

The graphite material was Number one large graphite flakes. These were obtained from the Superior Graphite Company, and pulverized in a CRC Micro-Mill, manufactured by the Chemical Rubber Company. For most of the cells, the graphite was used without further treatment. However, for Cell No. 9, the powdered graphite was purified at a temperature of 600° C by a flowing stream of dried chlorine gas.

The electrolyte preparation was carried out in a dry box. Pre-determined amounts of aluminum and sodium chlorides were weighed into a 600 ml beaker. A few grams of pure aluminum wire were added to the mixture and the entire mixture was heated to 200° C for several days. At the conclusion, the melt was water white, and contained a few black specks which usually settled to the bottom of the beaker.

The electrolyte pellets or wafers were prepared in accordance with the following procedures.

Fiberglass felt electrolyte wafers were prepared from 3.7 cm diameter Whatman GF/C glass fiber filter papers, each weighing about 0.05 g. The filter papers were dried at 500° C and then dipped into molten electrolyte, typically taking approximately 0.7 g of electrolyte. The electrolyte rapidly solidified, giving the wafers a translucent appearance.

In some instances, it was desirable to prepare fiberglass felt wafers which contained, in addition to the electrolyte, excessive solid sodium chloride. The wafer was first dipped in a saturated aqueous solution of sodium chloride, dried at 100° C, and finally heated to 530° C. On the average, wafers prepared in this manner contained approximately 0.1 g of solid sodium chloride. The sodium chloride impregnated wafer was then dipped into electrolyte saturated with respect to sodium chloride.

The preparation of woven fiberglass cloth electrolyte wafers was identical with the preparation of the fiberglass felt electrolyte wafers. A typical fiberglass cloth wafer weighed about 0.2 g and took up about 0.3 of electrolyte The composition and weight of electrolyte wafers immobilized with Cab-O-Sil are summarized in Table III.

The Cab-O-Sil, a high surface area silicon dioxide, was dried at 500° C for 1 hr., and then allowed to cool in an evacuated chamber. This was used to form Cab-O-Sil/Electrolyte Mixtures. Each of the Cab-O-Sil/electrolyte mixtures used in the fabrication of the cells of this invention contained 10 wt percent Cab-O-Sil; the remainder was electrolyte. The Cab-O-Sil/electrolyte mixtures were prepared in the dry box in the following manner: Using a digital balance to continuously monitor the weight, the desired amount of molten electrolyte was pipetted into the beaker. The beaker was then placed on a hotplate at approximately 250° C and, as the electrolyte became molten, the entire mixture was stirred thoroughly with a spatula. At the conclusion of this process, the mixture had the consistency of wet snow. The mixture was cooled and pulverized with CRC Micro-Mill.

Monolayer Wafers were prepared as follows: A 2 g sample of the Cab-O-Sil/electrolyte mixture was transferred into a Carver 1.125 in. diameter laboratory die and pressed at 24,000 psi. The resulting pellets were observed to have smooth, glossy surfaces and excellent physical properties; routine handling of the pellets in the dry box resulted neither in fracture of the pellets nor in loss of material from the surfaces. Typical pellets were approximately 1.7 mm thick and weighed a little over 1.9 g. The discrepancy between 1.9 g and the initial 2.0 g of Cab-O-Sil/electrolyte mixture is attributable to losses incurred during transfer and pressing of the mixture.

In most cells bilayer, rather than monolayer, wafers were used, with the layers containing equal amounts of Cab-O-Sil/electrolyte mixture. The wafer was made in two steps. First, the anaolyte/Cab-O-Sil mixture was placed in the die and pressed at 5,000 psi. Next, the catholyte/Cab-O-Sil mixture was added to the die and the entire bilayer wafer was pressed at 24,000 psi.

Multiple component wafers, defined as those having one or more components in addition to the Cab-O-Sil/electrolyte mixture, were easily prepared by the same technique. Consider, for example, a pellet with 10 wt percent NaCl in the anolyte layer and 16 wt percent graphite in the catholyte layer. First, the two ingredients for the anolyte layer (NaCl and Cab-0-Sil/electrolyte mixture) were finely powdered, thoroughly mixed, placed in the die, and pressed at 5000 psi. Next the two ingredients for the catholyte layer, also thoroughly mixed as powders, were added, and the entire pellet was pressed at 24,000 psi. It should be noted that multiple component wafers containing graphite tended to expand and shatter upon being ejected from the commercially available laboratory die. This problem was avoided by using a modified die with a slightly tapered barrel; the tapered barrel permitted gradual but controlled expansion of the pellet as it was ejected from the die.

Aluminum foil electrodes were used in a few early cells. These electrodes were found to have a very thin coating of insulating material which severely degraded their performance. No techniques were found for removing this insulating layer. In all remaining cells, aluminum, nickel and tungsten electrodes at least 10 mil thick were used. The Electrodes were burnished with emery paper, etched with dilute HCL, washed with water and acetone, and dried. Before assembly into cells, the electrodes were once again burnished lightly with emery paper.

In order to further illustrate this invention with greater particularity, the following example is presented as a specific embodiment of a cell contructed in accordance with the teachings of this invention.

EXAMPLE

An aluminum anode was prepared from aluminum 1100 alloy 15 mil foil, 1.125 in. diameter with tab. It was burnished with emery paper, etched with dilute HCl, washed with water, then actone. Then once again lightly burnished before assembly.

A stock electrolyte was prepared from equimolar $AlCl_3$, and NaCl, saturated with NaCl (net composition ca. 49.8 mole percent NaCl; 50.2 mole percent $AlCl_3$ and hot mixed with 10 wt percent Cab-O-Sil). The anolyte side of a bipellet was made from 0.90 gm stock electrolyte plus 0.10 gm NaCl. The mixture was finely pulverized, placed in 1.125 in. diameter Carver die and pressed at 5000psi. The catholyte mixture made from 0.84 gm of stock electrolyte plus 0.16 gm of graphite. Number one Superior Graphite Company graphite flakes were pulverized and heated at 600° C in a stream of dried chlorine gas before use. The dry mixture was finely pulverized, placed on top of the anolyte in the die, and the entire pellet pressed at 24000 psi. A cathodic current collector was prepared from tungsten 5 mil foil, 99.98 percent purity with a 1.125 in. diameter with tab burnished and washed as was the anode.

The cell components were placed in the platen press and held at 7.1 psi. The cell was assembled at room temperature. The platens were heated, and experimental measurements were begun when the cell had come to the desired operating temperature (163° C for this particular cell).

Internal resistance of the cell was determined by rapidly applying a load to an open circuited cell and observing the cell voltage just before and after this event, and the cell current after the load was applied. An oscilloscope was used at a sweeprate of 1 cm ms$^{-1}$ to monitor the event. The applied load was 0.1 ohm, and the observed internal cell resistance at 163° C was $0.1 + 0.01$ ohm.

The cell was charged at 222 mA and at 245 mA. It was discharged through a 5.0 ohm load. A dual pen strip chart recorder was used to continuously monitor the cell voltage and current during both the charge and discharge phases of the experiment. The results of charge-discharge experiments on this cell are shown in FIG. II. The performance of the cell was a direct function of the amount of charge placed on the cell. It is also apparent from FIG. 11 that the cell had a finite capacity, and this capacity was approached in the experiments illustrated. For example, Discharge I was very similar to Discharge H, even though the cell was charged for two minutes longer than in the case of Experiment I.

The relatively flat, low voltage plateaus of the discharge curves in FIG. II are attributable to concentration gradients built up during the charging step. This gradient will continue to grow, even after the "capacity" of the cell is reached; hence the continually greater plateau voltage at longer charge times. This gradient also is responsible for the slowly increasing open circuit voltages at longer charge time.

The present invention provides a lightweight, low cost, expendable, low temperature activated electrochemical power source of practical design. It provides the first successful implementation of high energy density expendable primary thermal batteries in pelletized form, utilizing aluminum chloride containing electrolytes; and offers the first opportunity to combine the unlimited shelf life and the high energy density of thermally activated reserve batteries with long active life expectancy. It is the first relatively low temperature molten salt battery capable of operating at temperatures of from about 130°–160° C and at lifetimes of from about 5 to 180 minutes.

While the principles of this invention have been described with particularity, it should be understood that various modifications and alterations can be made without departing from the spirit of the invention, the scope of which is defined by the appended claims.

What is claimed is:

1. An aluminum-chloride electrochemical cell comprising:
   a. an anode composed of an aluminum metal sheet;
   b. a cathode composed of chlorine as an electroactive material in contact with a tungsten metal sheet which serves as a cathodic current collector; and
   c. a two-layered, pelletized, electrolyte wafer sandwiched between said anode and said cathode, said wafer having both layers composed of a sodium chloride saturated equimolar mixture of aluminum chloride and sodium chloride immobilized in silicon dioxide and an amount of powdered graphite only in that layer adjacent to said cathode to act as a cathodic site, and an electronic conductor leading from the wafer interior to the current collector.

TABLE III

| CELL NUMBER | 50:50 ANOLYTE (gms)[1] | NaCl (gms) | 54:46 CATHOLYTE (gms)[2] | 50:50 CATHOLYTE (gms)[1] | GRAPHITE (gms) | PURIFIED GRAPHITE (gms) | FINAL WEIGHT (gms)[3] |
|---|---|---|---|---|---|---|---|
| 2 | 0.90 | 0.11 | — | 0.87 | 0.16 | — | 1.93 |
| 3 | 0.90 | 0.10 | 0.84 | — | 0.16 | — | 1.91 |
| 4 | Note 4 | — | — | Note 4 | 0.16 | — | 1.78 |
| 5 | 0.90 | 0.10 | — | 0.84 | 0.16 | — | 1.94 |
| 6 | 0.90 | 0.10 | — | 0.84 | 0.16 | — | 1.88 |
| 7 | 0.90 | 0.10 | — | 0.84 | 0.16 | — | 1.89 |
| 8 | 0.90 | 0.10 | — | 0.76 | 0.16 | — | 1.80 |
| 9 | 0.90 | 0.10 | — | 0.84 | — | 0.16 | |

[1] The electrolyte used to make both the 50:50 anolyte and the 50:50 catholyte contained equal molar amounts of NaCl and AlCl, and was saturated with respect to NaCl. The anolyte mixture was prepared by hot mixing 90 percent by weight electrolyte with 10 percent by weight Cab-O-Sil.

[2] The electrolyte used to make the 54:46 catholyte contained 54 mole percent $AlCl_3$ and the remainder NaCl. The catholyte mixture was prepared by hot mixing 90 percent by weight electrolyte with 10 percent by weight Cab-O-Sil.

[3] The final weight of the wafer is less than the sum of the weights of the materials used to make the wafer; some material was lost during the weighing, transferring and pelletizing operations.

Note 4: For Cell No.4, a ternary electrolyte was used which had the following molar compositions: $AlCl_3$ - 63.5 %, KCl - 16.5%, and NaCl - 20.0 %. The anolyte and catholyte mixtures were identical, and were prepared by combining 90% by weight ternary electrolyte with 10% by weight Cab-O-Sil. The electrolyte wafer was prepared from the following amounts of material: Anolyte section - 1.00 gm electrolyte mixture; catholyte section - 0.84 gm electrolyte and 0.16 gm graphite.